(12) United States Patent
Chang et al.

(10) Patent No.: US 6,263,208 B1
(45) Date of Patent: Jul. 17, 2001

(54) GEOLOCATION ESTIMATION METHOD FOR CDMA TERMINALS BASED ON PILOT STRENGTH MEASUREMENTS

(75) Inventors: Kirk K. Chang, Morganville; Daniel R. Jeske, Eatontown; Kiran M. Rege, Marlboro, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/321,729

(22) Filed: May 28, 1999

(51) Int. Cl.[7] ................................... H04Q 7/20
(52) U.S. Cl. ................ 455/456; 455/426; 342/357.02
(58) Field of Search ................................. 455/456, 436, 455/440, 524, 450, 426; 342/357.01, 357.02, 357.03, 357.04

(56) References Cited

U.S. PATENT DOCUMENTS

| | | | |
|---|---|---|---|
| 5,508,707 | * | 4/1996 | LeBlanc et al. ............... 342/457 |
| 5,602,903 | * | 2/1997 | LeBlanc et al. ............... 379/60 |
| 5,768,686 | * | 6/1998 | LeBlanc et al. ............... 455/31.1 |
| 5,949,988 | * | 9/1999 | Feisullin et al. ............... 395/500.23 |
| 5,960,341 | * | 9/1999 | LeBlanc ............... 455/426 |
| 6,046,698 | * | 4/2000 | Pandey ............... 342/360 |
| 6,052,598 | * | 4/2000 | Rudrapatna et al. ............... 455/456 |
| 6,067,484 | * | 5/2000 | Rowson et al. ............... 701/16 |
| 6,084,955 | * | 7/2000 | Key et al. ............... 379/220 |

* cited by examiner

Primary Examiner—Edward F. Urban
Assistant Examiner—Blane J. Jackson
(74) Attorney, Agent, or Firm—Gary D. Yacura

(57) ABSTRACT

The location of a mobile unit in the service area of a CDMA wireless communications system is determined by a location probability distribution procedure that is based entirely on analytical results derived from an integrated model of the wireless communications system, its RF environment and attribute measurement. The mobile unit measures and reports attribute values of pilot signal strength of all pilot signals visible to the mobile unit at its present location, whereupon a location probability distribution is computed based on a Bayesian probability algorithm including a set of stored model parameters.

21 Claims, 5 Drawing Sheets

GEOLOCATION ESTIMATION METHOD FOR CDMA TERMINALS BASED ON PILOT STRENGTH MEASUREMENTS

CROSS REFERENCE TO RELATED APPLICATIONS

This application is related to U.S. Ser. No. 09/139,107 (Lucent IDS#115031) entitled "Pattern Recognition-Based Geolocation", filed in the names of T. C. Chiang et al on Aug. 26, 1998, and U.S. Ser. No. 09/294,997 (Lucent file No. 3-4-3-4-1-15) entitled "A Bayesian-Update Based Location Prediction Method For CDMA Systems", filed in the names of K. K. Chang et al on Apr. 20, 1999. These related applications are assigned to the assignee of the present invention and are meant to be incorporated herein by reference.

BACKGROUND OF THE INVENTION

1. Field of the Invention

The present invention relates to a method for locating a mobile telephone unit within a cellular service area, and more particularly to a method for estimating the location of a CDMA mobile unit based upon the probability of its being at a particular location of the service area in response to a sequential set of attributes observed by the mobile unit and reported back to a base station.

2. Description of Related Art

A cellular telephone system must be able to locate a mobile unit within a cellular service area under various RF propagation conditions such, for example, when an E911 call is made from the mobile unit. Conventional methods for locating a mobile unit are typically based on either a triangulation technique which requires signals from three or more base stations within a designated service area, or an angle of arrival technique which requires at least two base stations. In many areas, the number of base stations the mobile unit can detect is less than two. Furthermore, both the triangulation and angle of arrival techniques inherently suffer from inaccuracies and signal fading which result from multi-path propagation.

In the first above-noted related patent application Ser. No. 09/139,107 entitled "Pattern Recognition-Based Geolocation", RF characteristics pertaining to one or more pilot signals radiated from a base station and specific to a particular location within the service area are detected by a mobile unit and transmitted back to a base station where they are matched to a known set of RF characteristics and other information stored in a database located, for example, in a base station server. The database contains what is known in the art as attribute information and includes, for example, RF characteristics, e.g. pilot signal strength measurements indicative of power and phase-offset, time delay, angle of arrival and round-trip delay of pilot signals which differentiates one location from another. For convenience, the cellular service area is divided into a rectilinear grid and an exhaustive survey consisting of measurements of different attributes is carried out at each of the grid points (sub-cells) to identify the attribute values associated therewith. This information is stored in the database. It should be noted that collection of this information is an inherently time consuming and costly procedure.

In the second above-noted related patent application Ser. No. 09/294,997 entitled "A Bayesian-Update Based Location Prediction Method For CDMA systems", the invention is directed to a method of estimating, by a Bayesian probability computation procedure, the location of a mobile unit in the service area of a CDMA cellular telephone system using a model based approach which, among other things, simplifies the generation of a database containing a pilot signal visibility probabilities. This eliminates the need for repeated attribute measurements at all of the grid points (sub-cells) in the cellular service area. The database is generated by running a simulation for all grid-points or sub-cells in the service area with probability values then being stored in a memory. A probability distribution is then computed using two sets of probabilities, one set comprising the pilot signal visibility probabilities stored in the database, and the other set comprising phase-offset probabilities which are generated in real time without the need for a stored database. The mobile unit typically reports multiple sets of measurements made at relatively small time intervals and an "a-posteriori" location probability distribution is generated to provide an estimate of the mobile unit's location. The location probability distribution is computed sequentially so that the "a-posteriori" distribution computed at the end of one iteration is used as the "a-priori" distribution for the next iteration.

SUMMARY OF THE INVENTION

The present invention is directed to a method of estimating the location of a mobile unit in the service area of a CDMA cellular telephone system also using a model based approach, but which now eliminates the need for a stored database containing pilot signal visibility probabilities for all of the grid points or sub-cells in the cellular service area as described above with respect to the above referenced related Bayesian-Update invention, U.S. Ser. No. 09/294,997.

In the present invention, pilot power measurements are utilized and comprise measurements made by the mobile unit of all of the received pilot signals from the base stations which are visible to the mobile unit in its neighbor set. The mobile unit then reports these measurements, typically in the form of pilot strength measurement messages. These messages are then used by computing apparatus at one of the base stations, or at a mobile switching center, which provides a common access point to a plurality of base stations, to perform a sequential location estimation procedure based on a Bayesian probability framework. The estimation procedure is based entirely on analytical results involving one or more key approximations derived, for example, from an integrated model of the wireless communications system, its RF environment, and attribute measurement. These analytical results are obtained by digital computer apparatus using compact, straightforward computer code, i.e., software, thus eliminating the need for a relatively large database of stored visibility probabilities heretofore required.

The model based approach of this invention requires identifying the underlying RF and attribute measurement model for the coverage area. These models are represented by a small set of parameters which are determined by carrying out measurements at a plurality of systematically selected locations. These measurements are then used to adjust the values of the parameters until an acceptable match between the pilot strength values predicted by the model and the corresponding measurements exist. These model parameters are then stored for subsequent location prediction iterations which involve computing an estimate of the mobile unit's location using a mean or mode of the "a-posteriori" location probability distribution following a computation of the conditional probability of the mobile unit observing the reported pilot measurements if the mobile unit were located at each grid point in the zone.

While pilot strength measurements are typically used, other measurements which can be reported to a base station by the mobile, such as phase offsets between different pilots and angle of arrival, can be included or used in place of pilot strength measurements.

DETAILED DESCRIPTION OF THE INVENTION

Figure 1:
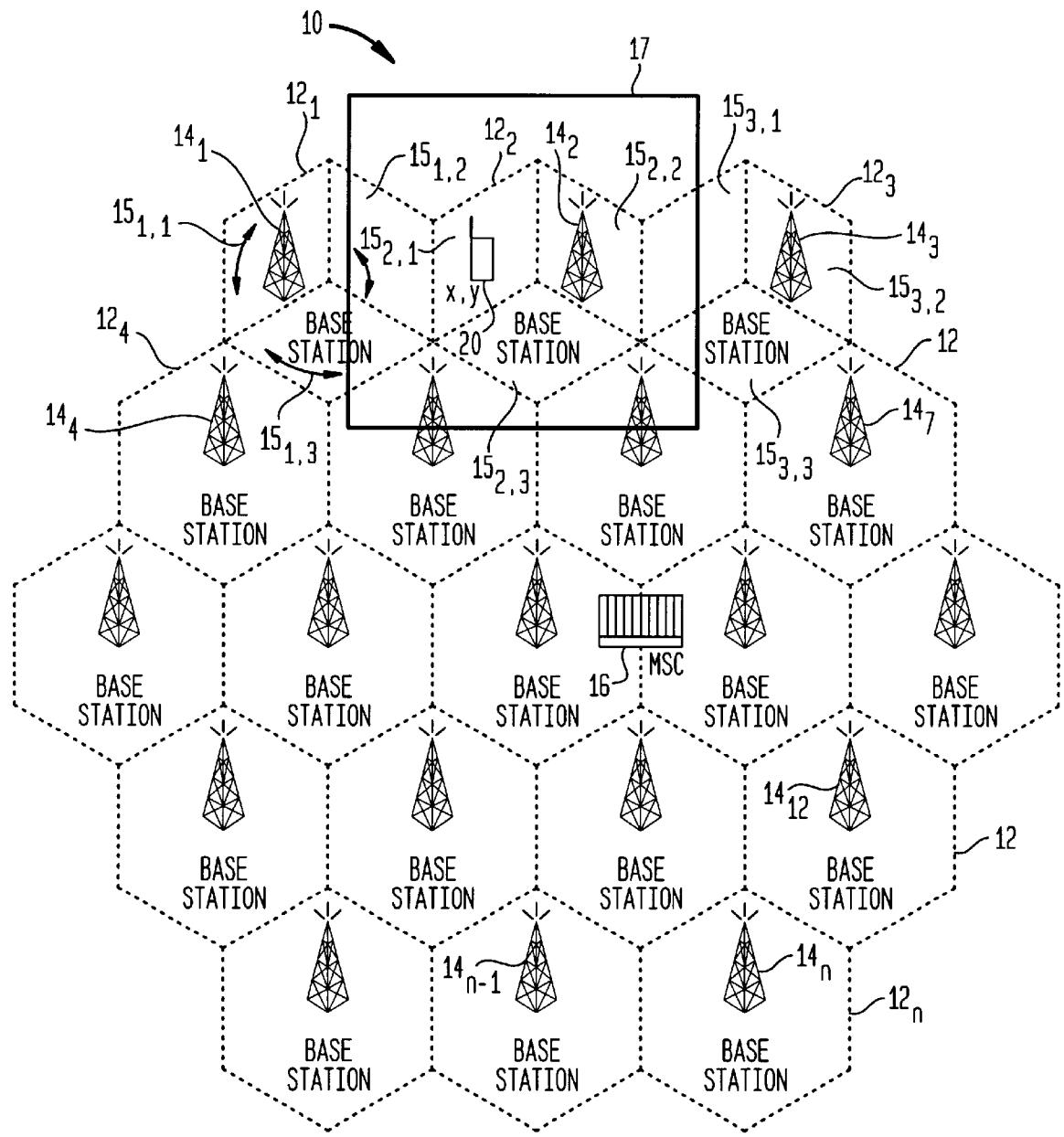
FIG. 1 is illustrative of a cellular service area divided into a plurality of cells.

Referring now to the drawings and more particularly to FIG. 1, reference numeral 10 denotes a service area for a CDMA cellular telephone system partitioned into a plurality of contiguous cells 12. FIG. 1 also depicts a plurality of base stations $14_1, 14_2, \ldots 14_{n-1}, 14_n$ located within the service area 10. Also, the service area 10 includes at least one mobile switching center (MSC) 16. Typically, each of the base station $14_1, \ldots, 14_n$ has a sectorized antenna with a distinct pilot signal channel associated with each sector. Three sectored antennas are most common. Each sector of the antenna serves a corresponding sector of the associated cell. In FIG. 1, all of the base stations have three sectors each. The three sectors associated with base station $14_1$, for example, are denoted by the symbols $15_{1,1}, 15_{1,2}$ and $15_{1,3}$, respectively. A mobile unit 20 is located in sector $15_{2,1}$.

Figure 2:
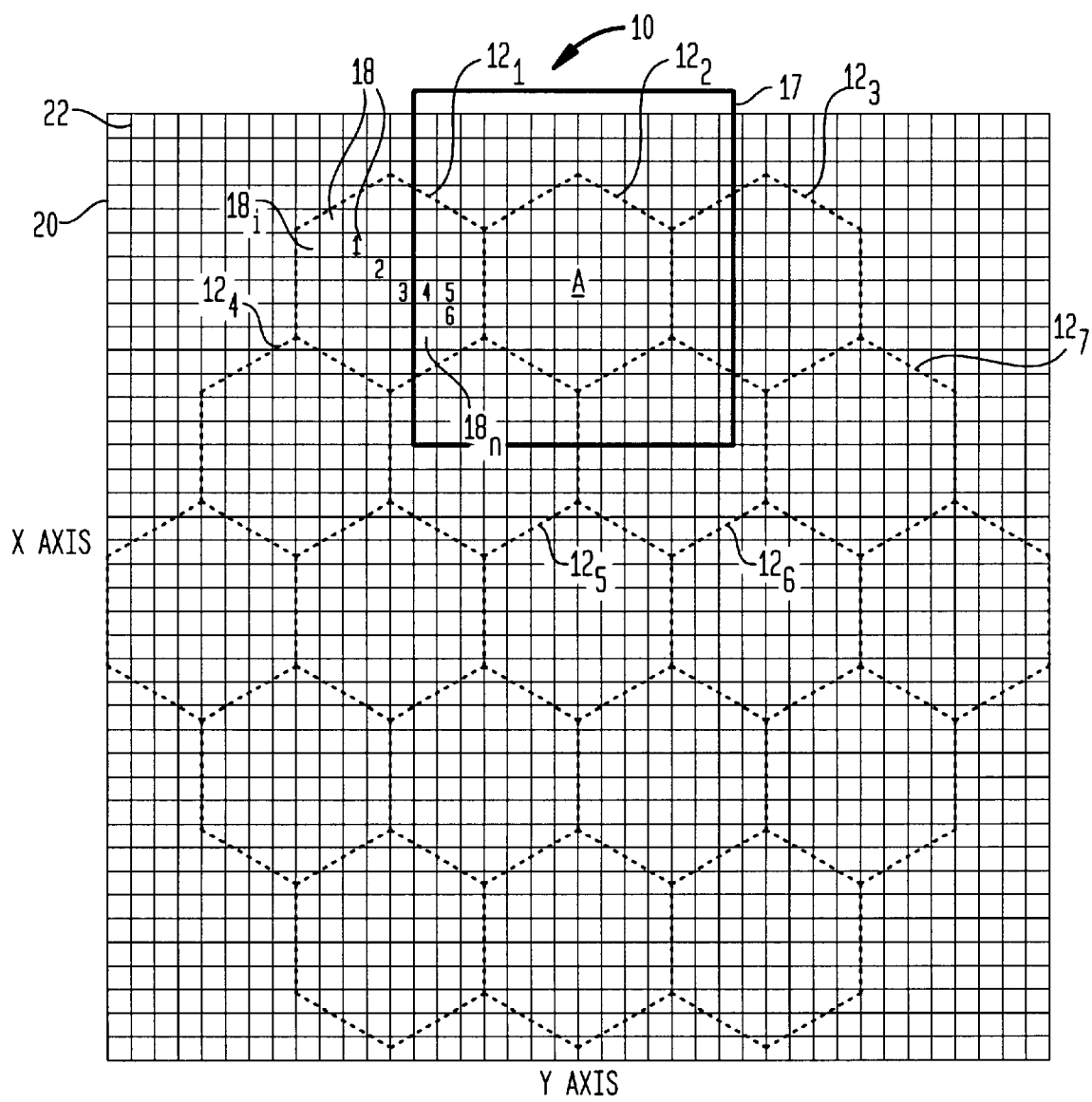
FIG. 2 is illustrative of the cells shown in FIG. 1 being further divided into sub-cells.

FIG. 2 is further illustrative of the cells 12 being further divided into sub-cells 18 and which are represented by a grid formed by rectilinear grid lines 20 and 22. The reference numbers 1, 2, 3 . . . 6 of FIG. 2 represent individual sub-cells $18_1, 18_2, \ldots, 18_6$, respectively.

Figure 3:
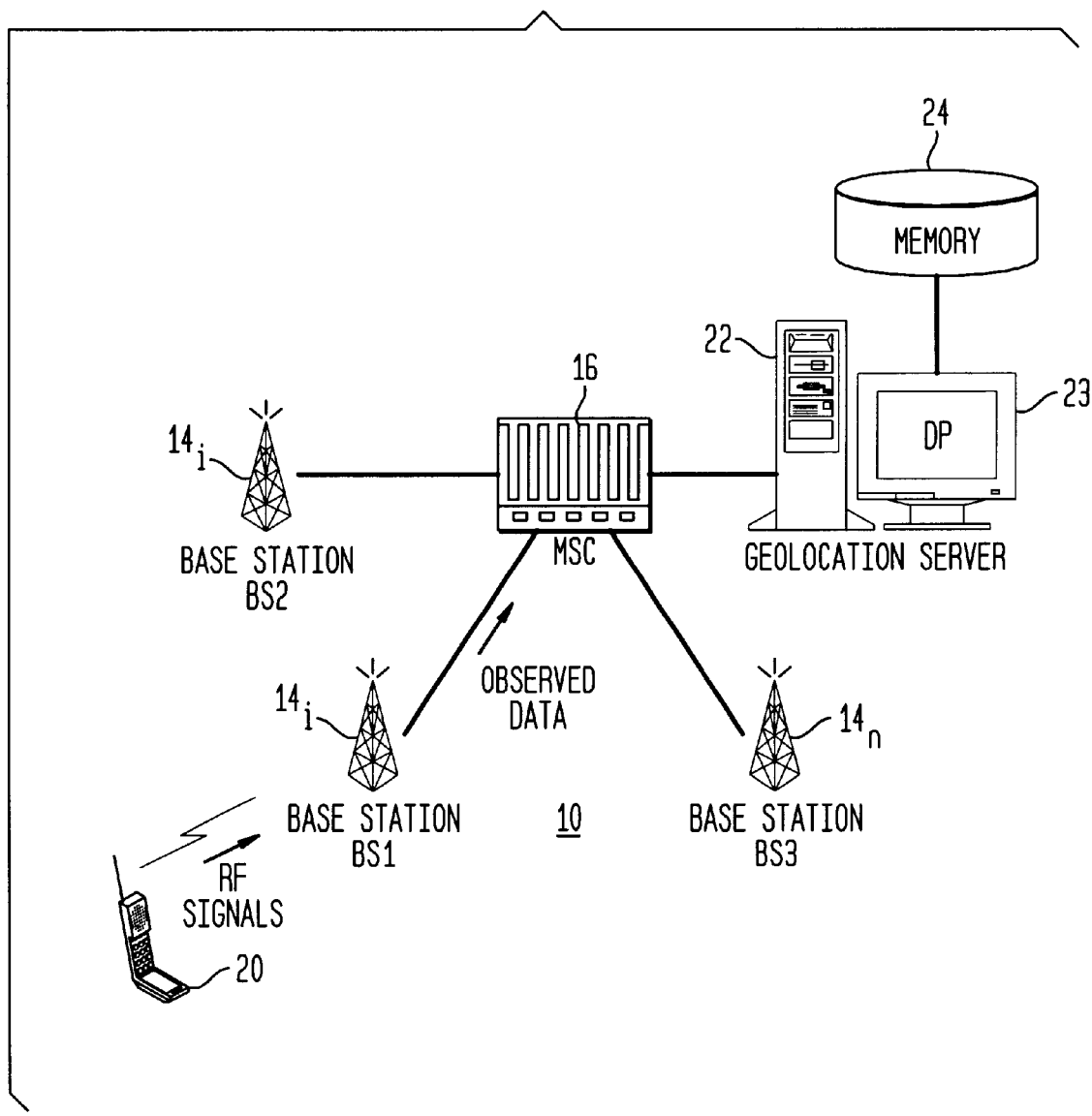
FIG. 3 is illustrative of an embodiment of the subject invention.

Turning attention now to FIG. 3, shown thereat is a diagram broadly illustrative of the system architecture for determining the location of a mobile unit 20 within the service area 10 in accordance with the subject invention. The MSC 16 operates in conjunction with a plurality of base stations $14_1, \ldots, 14_n$ and connects to the local telephone system, not shown. A server 22 including digital computer apparatus 23 and a memory 24 for storing computation procedures and word parameters and system data are typically located at the site of the MSC 16 for purposes which will now be explained.

In the invention described in the first referenced related application U.S. Ser. No. 09/139,107, each sub-cell $18_1, \ldots, 18_n$ of the service area 10 (FIG. 3) is identified by a set of observable, i.e. detectable characteristics which are referred to as attributes and include, for example, RF characteristics, e.g. measured pilot signal strength (Ec/Io), phase-offsets, time delay or angle of arrival, and round trip delays of one or more pilot signals, hereinafter referred to simply as "pilots", radiated from each of the base stations $14_1, \ldots, 14_n$.

Ser. No. 09/139,107 includes a database (DB) which contains attribute information which differentiates one sub-cell 18 from another and is generated by making a repeated and exhaustive survey which involves taking repeated measurements at all the sub-cells $18_1, \ldots, 18_n$ (FIG. 2) of the service area 10. During the operation phase, after the database has been set up and the location service has been deployed, the mobile unit 20 detects and measures attribute values, e.g., pilot strengths and phase offsets, from its actual location in sub-cell $18_i$ and reports them via a message, e.g. a pilot strength measurement message (PSMM), to the base station(s) $14_1, \ldots, 14_n$ (FIG. 3), which can be one or more of the base stations with which it is in communication. The base station(s) forward their respective reported measurements to a location server 22 via MSC 16. When the attributes are reported to the server 22, the digital computer apparatus 23 associated with the server 22 statistically compares the measured values with the known attribute values stored in the database 24 of all the sub-cells 18 in the service area 10. The sub-cell $18_i$ whose attribute values as stored in the database provide the best match for the measurements reported by the mobile unit 20 is considered to be the best estimate of the mobile unit's location.

In the second referenced related patent application, U.S. Ser. No. 09/294,997, a database is also used to assist the process of location estimation. However, in contrast to the first referenced patent application Ser. No. 09/139,107, it uses a model based approach to generate a database containing pilot visibility probabilities for different sub-cells 18 in the service area 10. The model based approach requires that a limited number of pilot strength measurements be carried out along a few representative routes in the service area 10. These measurements are then used to identify the parameters of the model that characterizes the service area and its RF environment. Once these parameters are identified, simulations are then carried out to populate the database containing the pilot visibility probabilities, which are used in the computation of the location distribution of a mobile unit requesting location service. An iterative procedure based on a Bayesian probability computation is then used to obtain improved estimates of the mobile unit's location in response to multiple sets of attribute measurements being reported by the mobile unit 20. The model based approach eliminates the need to carry out extensive measurements required by Ser. No. 09/139,107.

Considering now the present invention, it also uses the model based approach embodied in Ser. No. 09/294,997 to identify the model to represent the RF environment of the service area 10 and the measurement process. It also uses the iterative procedure based on Bayesian probability computation to improve location estimation in response to multiple sets of measurements being made available. However, in contrast to Ser. No. 09/294,997, the present invention does not now use a database containing pilot visibility probabilities to compute the location probability distribution for the mobile unit. Instead, it uses a set of store model parameters directly in a number of computational procedures based on analytical results to compute the location probability distribution of the mobile unit. These procedures are compact and are implemented, for example, in software residing in the digital computer apparatus 23 shown in FIG. 3.

Accordingly, in the present invention, pilot strength measurements are first carried out along a small number of representative routes in the service area 10 and from which an RF signal propagation and attribute measurement model is constructed to represent the RF environment of the service area and the pilot measurement process. The parameters of this model are then adjusted to yield an acceptable match between pilot strengths predicted by the model and the corresponding measurements.

The RF propagation model used to represent the RF environment associated with the service area and how it is used to generate the database containing pilot visibility probabilities will now be explained.

Referring back to FIG. 1, for sectors $15_{1,1}$, $15_{1,2}$, $15_{1,3}$, $15_{2,1}$, ..., $15_{n,3}$, let $T_{1,1}$, $T_{1,2}$, $T_{1,3}$, $T_{2,1}$, ..., $T_{n,3}$ respectively denote the total transmit powers associated with those sectors. Assume that each sector uses a fraction, $\gamma$, of its total transmit power T for its pilot channel. For example, the pilot channel power for sector $15_{1,1}$ can be expressed as $\gamma T_{1,1}$.

Now consider a mobile unit 20 at a location (x,y) i.e., at a grid point $18_i$ in the service area 10. The model assumes that the total power $R_{i,j}(x,y)$ received by a mobile unit 20 from sector $15_{i,j}$ (i=1, 2, . . . , n and j=1, 2, 3) is given by $$R_{i,j}(x,y)=T_{i,j} \cdot G_{i,j}(x,y) \cdot L_{i,j}(x,y) \cdot F_{i,j}(x,y) \cdot M_{i,j}(x,y) \quad (1)$$

where $G_{i,j}(x,y)$ is the antenna gain for sector $15_{i,j}$ along the direction pointing towards the location (x,y), $L_{i,j}(x,y)$ is the distance loss between the base station $14_i$ associated with sector $15_{i,j}$ and the location (x,y) and $F_{i,j}(x,y)$ is the corresponding shadow fading factor and $M_{i,j}(x,y)$ is the measurement noise factor, all in absolute, not dB, units. The measurement noise factor is meant to include the effects of fast, e.g., Rayleigh/Rician fading as well as inaccuracies in the measurement process. The pilot channel power received by the mobile unit 20 at location (x,y) from sector $15_{i,j}$ is then equal to $\gamma R_{i,j}(x,y)$.

The model assumes that the distance loss $L_{i,j}(x,y)$ can be expressed as:

$$L_{i,j}(x,y)=C_p \cdot [d_{i,j}(x,y)]^{-\alpha} \quad (2)$$

where $d_{i,j}(x,y)$ is the distance between the base station $14_i$ associated with the sector $15_{i,j}$ and the location (x,y), and $C_p$ and $\alpha$ are constants. Typically, $C_p$ takes a value in the range $10^{-10}$ to $10^{-15}$ and $\alpha$ is between 3 and 5 when $d_{i,j}(x,y)$ is expressed in units of miles. The two parameters $C_p$ and $\alpha$, moreover, are environment specific.

The shadow fading factor $F_{i,j}(x,y)$ models the impact of terrain and large structures on signal propagation, which create deviations around the signal attenuation predicted by the deterministic path loss and can be written as:

$$F_{i,j}(x,y)=10^{a+(X_{i,j}/10)} \quad (3)$$

where X is a zero-mean Gaussian random variable with standard deviation $\sigma_s$ and a is a normalization constant chosen so that the mean value of $F_{i,j}(x,y)$ equals 1. Moreover, shadow fading factors display spatial correlation. That is, shadow fading factors between a base station $14_i$ and locations that are reasonably close to each other display statistical correlation. This fact can be represented in the model as follows.

Now, let $(x_1,y_1)$ and $(x_2,y_2)$ be two locations in the service area separated by d meters and let $F_{i,j}(x_1,y_1)$ and $F_{i,j}(x_2,y_2)$, respectively, be the shadow fading factors between the sector $15_{i,j}$ and the locations $(x_1, y_1)$ and $(x_2, y_2)$:

Accordingly, $$F_{i,j}(x_1,y_1)=10^{a+(X^{(1)}_{i,j}/10)} \quad (4a)$$

and $$F_{i,j}(x_2,y_2)=10^{a+(X^{(2)}_{i,j}/10)} \quad (4b)$$

Next the model assumes that the covariance between the exponents $X^{(1)}_{i,j}$ and $X^{(2)}_{i,j}$ is given by:

$$E[X^{(1)}_{i,j} X^{(2)}_{i,j}]=\eta \sqrt{E[(X^{(1)}_{i,j})^2]E[(X^{(2)}_{i,j})^2]}=\eta \sigma_s^2 \quad (5)$$

where $\eta=e^{-d/D_0}$. The parameter $D_0$ is called the correlation length associated with the shadow fading environment. It is found that depending on the environment, the correlation length can vary from a few tens of meters to several hundreds of meters.

The measurement noise factor $M_{i,j}(x,y)$ is also assumed to have a lognormal distribution so that we can write:

$$M_{i,j}(x,y)=10^{b+(Y_{i,j}/10)} \quad (6)$$

where $Y_{i,j}$ is a zero mean Gaussian random variable with standard deviation $\sigma_m$. We assume that the components $Y_{i,j}$ corresponding to different measurements of the same pilot (or different pilots) are independent.

Assume now also that the pilot strength measurement carried out and reported to the base station $14_i$ by the mobile unit 20 is the ($E_c/I_o$ value) of the corresponding pilot channel signal. This value is the ratio of the pilot channel power from the concerned sector received by the mobile unit 20 to the total power received by the mobile unit including thermal noise, and, possibly, external interference.

By letting $P_{i,j}(x,y)$ denote the strength ($E_c/I_o$ value) of pilot channel associated with sector $15_{i,j}$ as measured by a mobile unit located at the point (x,y), Then:

$$P_{i,j}(x, y) = \frac{\gamma R_{i,j}(x, y)}{N_0 + R_{1,1}(x, y) + R_{1,2}(x, y) + \ldots + R_{n,3}(x, y)} \quad (7)$$

where $N_0$ denotes the thermal noise and external interference. Hereinafter, for convenience, the symbol (ij) will be used to refer to the pilot channel associated with sector $15_{i,j}$.

The description of the RF propagation and pilot measurement model is now complete. Note that the parameters pertaining to the total transmit powers i.e. $T_{1,1}$, $T_{1,2}$, . . . , $T_{n,3}$ the fraction $\gamma$ of power used for the pilot channel, the antenna gains and orientations which enable one to compute antenna gains in different directions are known to the service provider. Thus, the only parameters whose values need to be determined by matching predicted pilot strengths with measured values are the distance loss parameters $C_p$ and $\alpha$, the shadow fading standard deviation $\sigma_s$, correlation length $D_0$, measurement noise standard deviation $\sigma_m$ and the thermal noise power $N_0$.

Once all of the unknown parameters are determined, the computational procedure used to compute the probability of the mobile unit being in different sub-cells can be carried out. The procedures used in the computation of these probabilities will now be described. In one preferred method according to this invention, the location prediction method uses pilot strength information in a binary form, that is, it is only concerned with whether or not a pilot was visible, i.e., whether or not its $E_c/I_o$ value was measured above a predetermined threshold T and thus is represented by either a "1" or "0". It is straightforward, however, to extend this method to the case where the mobile reports the actual measured pilot strength provided it was above the visibility threshold T.

Figure 4A:
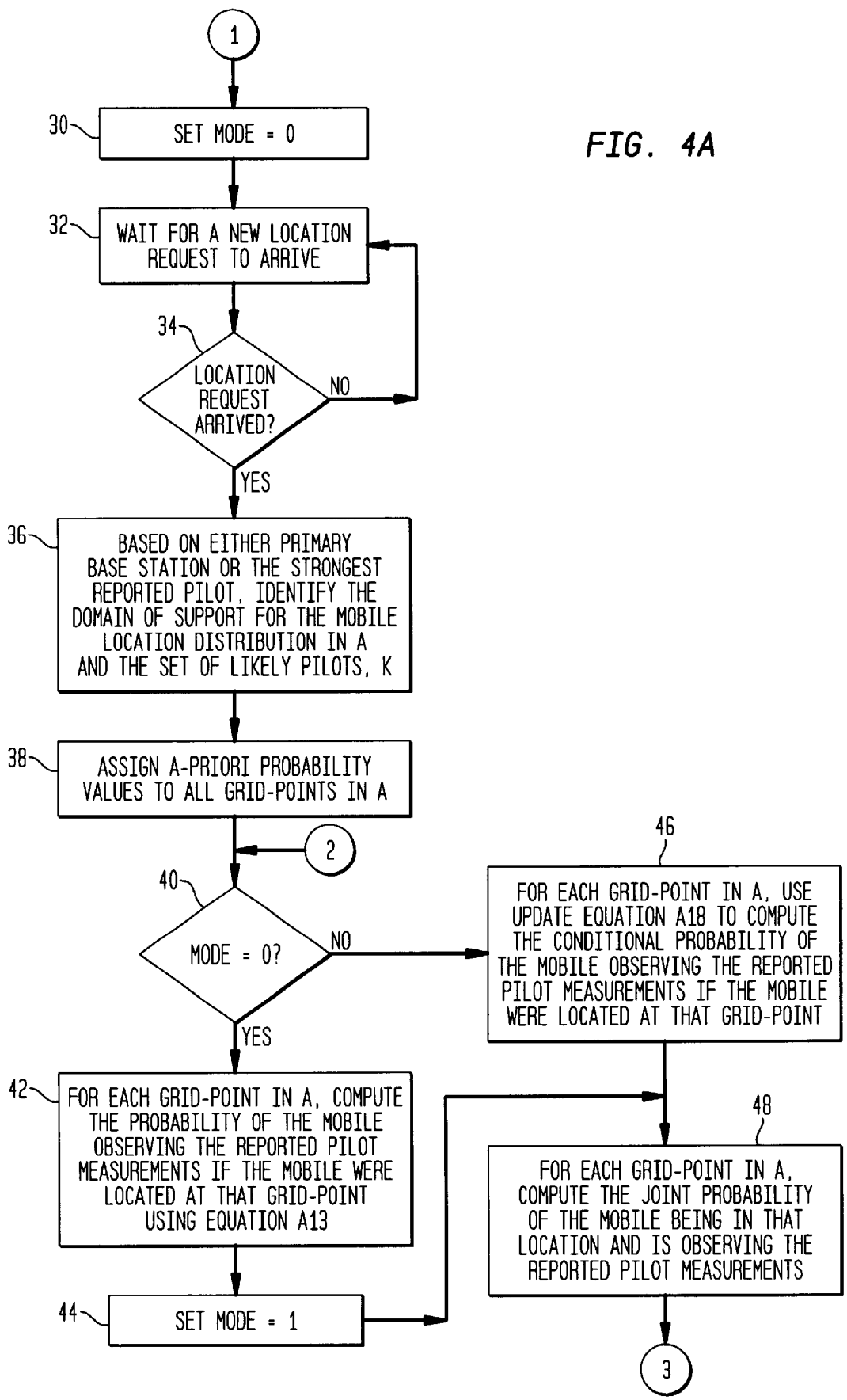
FIGS. 4A and 4B depict a flow chart generally illustrative of the method of determining the locality of a mobile unit in accordance with the subject invention.
Figure 4B:
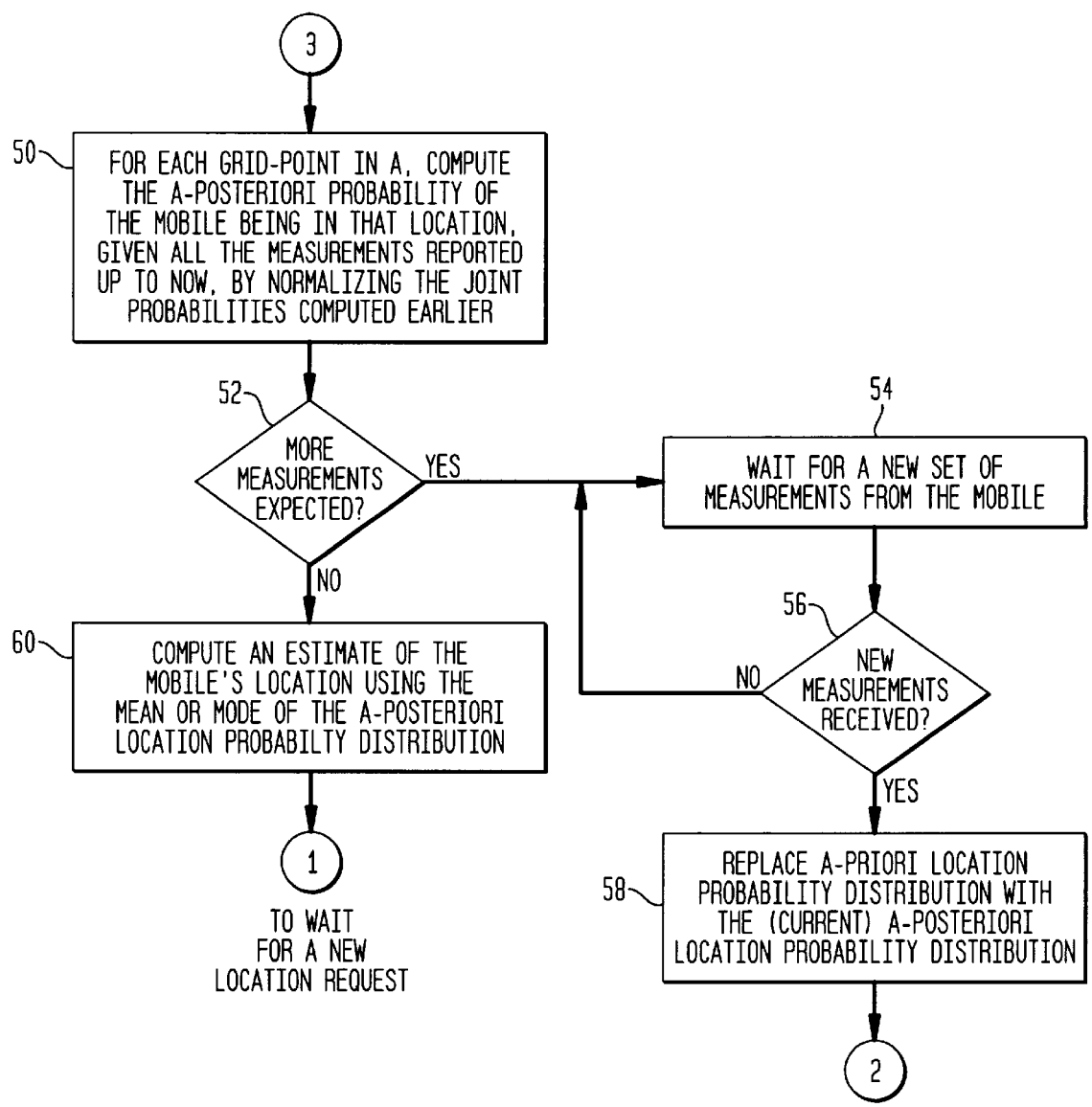

Considered in light of the accompanying Appendices A and B and referring to FIGS. 4A and 4B, the process of location probability estimation in accordance with the subject invention, as noted above, is implemented in software which resides in the computer apparatus 23 located at the geolocation server 22 (FIG. 3).

The process begins with a MODE set step 30 followed by step 32 where the system waits for a location service request to arrive from a mobile unit 20. In this state, the value of one of its internal variable operational MODE values have been set to "0" per step 30 to indicate the first iteration of a plurality of iterations. The process, referred to hereinafter as the geolocation process, continually checks for the arrival of a location service request at step 34, and if no such request has arrived, it goes back to the waiting state, (step 32). When a location service request arrives, the geolocation process identifies the domain of support for the mobile unit's location probability distribution based on either the identity of the primary base station of the mobile unit or the identity of the strongest pilot signal reported by the mobile unit. This is indicated by the step 36. Pilot signals will hereinafter be referred to simply as "pilots".

In the example shown in FIGS. 1 and 2, if the primary base station for the mobile unit 20 is $14_2$, the region designated 17 in FIGS. 1 and 2 would be selected as the domain of support for the location probability distribution of the mobile unit 20 and will be hereinafter referred to as the region A. Along with the region A, the geolocation process at step 36 also identifies the set of all pilots K which are likely to be visible at some of the grid points 18 in the region A. Next, in step 38, the geolocation process assigns a-priori probability values to all grid-points 18 having x and y coordinates in region A (FIG. 2). We can express this as:

$$P^{(O)}(x, y) = \frac{1}{\|A\|} \text{ for all } (x, y) \in A, \qquad (8)$$

where (x,y) denotes a grid-point $18_i$ in A, $\|A\|$ is the number of grid-points $18_i \ldots 18_n$ contained within A and $P^{(O)}_{(x,y)}$ denotes the a-priori probability of the mobile unit 20 being at a grid-point (x,y).

Next, in step 40, the geolocation process checks to see if the MODE value is equal to "0". If it is, i.e., if the first set of pilot strength measurements is being processed, it uses equation A13 in the attached Appendix A to compute, for each grid-point (x,y) in A, the probability of the mobile unit 20 observing pilot strengths as reported in the set of measurements being processed if it were located at the grid-point (x,y). This is denoted by reference numeral 42. The MODE value is now set to "1" per step 44, indicating that the first set of measurements has now been processed.

If, on the other hand, at step 40 it is found that the variable mode setting is not equal to "0", the geolocation process uses equation A18 given in the attached Appendix A per step 46 to compute the probability for each grid-point (x,y) in A of the mobile unit 20 observing pilot strengths as reported in the current set of measurements being processed if it were located at that grid point.

At the end of step 42 as well as step 46, for each grid-point (x,y) in A, the probability of the mobile unit observing pilot strengths as reported in the set of measurements being processed is provided. In both instances, the geolocation process in accordance with the subject invention moves to the next step 48 where it computes for each grid-point (x,y) in A the joint probability of the mobile unit 20 being in location (x,y) and observing pilot strengths as reported in the set of measurements being processed. This probability is simply the product of the current a-priori probability of the mobile unit 20 being in the location (x,y) and the conditional probability computed in the previous step 46.

Following this in step 50 (FIG. 4B), the geolocation process computes for each grid-point (x,y) in A, the a-posteriori probability of the mobile unit 20 being at that grid-point (x,y) given all of the sets of measurements processed up to present time. This is done by normalizing the joint probabilities computed in step 50 so that they sum to 1 when the sum is carried out over all grid points in sub region A.

At this stage if more sets of measurements are expected at step 52, the geolocation process goes into a wait state, step 54, for which it continually checks for the arrival of a new set of measurements, step 56. When a new set of measurements arrives, the geolocation process, in step 58, replaces the a-priori location probability distribution with the current a-posteriori location probability distribution computed at the end of the last execution of step 50, and then moves to step 40 to process the newly arrived set of pilot measurements.

On the other hand, at step 52, if no more sets of pilot strength measurements are expected, an estimate of the location of the mobile unit 20 is computed at step 60 using either the mean or the mode, or any other suitable function, of the a-posteriori location probability distribution that was computed at the last execution of step 50.

The task of the geolocation estimation process is now complete at this stage and therefore the system reverts back to its normal, waiting state, (step 32), where it awaits the arrival of a new location service request with the variable MODE set to "0".

The iterative procedure described above operates to provide an improved estimate of the location probability distribution as more and more sets of pilot measurements are reported and is similar to the Bayesian Update Location Prediction Method reported in Ser. No. 09/294,997. As noted earlier, the difference lies in the fact that the present method uses computational procedures based on analytical results derived from pilot signal strength measurements as opposed to a method which uses a database of pilot visibility probabilities that are determined through a simulation sequence.

The iterative procedure according to the principles of the subject invention described above only uses pilot strength measurements. However, as noted earlier, it can readily be extended to include other measured quantities such as phase offsets. Also, when desirable, the method of the present invention can be modified so that the actual signal strength of the visible pilot can be used in the determination of aforementioned probabilities rather than a binary representation of the fact that the pilot(s) are or are not visible.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A method of estimating the location of a mobile communications unit in a wireless communications service area, comprising the steps of:
   (a) receiving signal strength measurements transmitted from a mobile unit located in the service area, said signal strength measurements being specific to the location wherein the mobile unit is presently located;
   (b) computing a location probability distribution using Bayes theorem of the mobile unit within the service area in response to the received signal strength measurements using analytical results derived from a model that accounts for distance loss, shadow fading, fast fading and measurement errors the service area being defined in terms of a set of stored parameters that are associated with each of said plurality of locations in the service area; and
   (c) generating an output indicative of the probability that the mobile unit is located at each of said plurality of locations in the service area.

2. A method according to claim 1 wherein said model comprises an integrated model of the wireless communication system, its RF environment, and received signal strength measurements.

3. A method according to claim 1 and additionally including a step (d) prior to step (b) of reducing the effective size of the service area to a sub-region of present interest and using it in step (b) so as to reduce the number of computations required therein.

4. A method according to claim 3 wherein said mobile unit comprises a CDMA mobile unit.

5. A method according to claim 4 wherein said received signal strength measurements comprises power measurements of one or more pilot signals visible to the mobile unit in said sub-region.

6. A method according to claim 5 wherein said received signal strength measurements comprises power measurements of substantially all pilot signals visible to the mobile unit in said subregion.

7. A method according to claim 6 wherein the location probability distribution computed in step (b) comprises an a-posteriori location probability distribution.

8. A method according to claim 7 wherein the location probability distribution is iteratively updated on receiving new received signal strength measurements from the mobile unit and wherein the a-posteriori probability distribution computed in one iteration comprises an a-priori distribution for the next iteration.

9. A method according to claim 1 and prior to steps (a)–(c), additionally including the steps of:
   (d) generating an RF environment and measurement model of the service area, said model being characterized by a set of parameters having initial values;
   (e) performing measurements at a plurality of systematically selected locations within the service area and obtaining therefrom a set of measured signal strength values for said locations;
   (f) adjusting said initial values of the model parameters until the model is able to predict signal strength values which substantially match the corresponding measured values; and
   (g) storing the adjusted values of the model parameters for subsequent use in step (b).

10. A method according to claim 1 wherein said model comprises a probabilistic model.

11. Apparatus for estimating the location of a mobile communications unit in the service area of a wireless communications system comprising:
   a plurality of base stations and at least one switching center providing a common access to said plurality of base stations;
   computing apparatus including a memory, electrically connected to at least one of said base stations or said switching center, for storing a set of parameters of an integrated model of the wireless communications including the RF environment and wherein the values of the parameters are adjusted to obtain a substantial match between measured signal strength values at a predetermined number of locations in the service area and the corresponding values predicted by the model;
   said computing apparatus further including a software for calculating, in response to signal strength values being measured and reported by the mobile unit from a specific location within the service area, a location probability distribution using Bayes theorem of the mobile unit within the service area using analytical results; and,
   circuit means coupled to said computing apparatus for generating an output indicative of the location probability distribution.

12. A system according to claim 11 wherein the location probability distribution comprises an a-posteriori location probability distribution.

13. A system according to claim 12 wherein the location probability distribution computation is iteratively updated on receiving new signal strength measurements from the mobile unit.

14. A system according to claim 13 wherein the a-posteriori location probability distribution computed in one iteration of a plurality of successive iterations comprises an a-priori location probability distribution of the next iteration.

15. A system according to claim 11 wherein the service area is subdivided into a plurality of sub-regions including at least one base station therein.

16. A system according to claim 11 wherein said mobile unit comprises a unit operable in connection with a CDMA wireless communications system.

17. A method of estimating the location of a mobile communications unit in a wireless communications service area, comprising the steps of:
   (a) receiving measured quantities of a signal transmitted from a mobile unit located in the service area, said measured quantities being specific to the location wherein the mobile unit is presently located;
   (b) computing a location probability distribution using Bayes theorem of the mobile unit within the service area in response to the received measured quantities using analytical results derived from a probabilistic model that accounts for distance loss, shadow fading, fast fading and measurement errors, the model being defined in terms of a set of stored parameters that are associated with the plurality of locations in the service area; and
   (c) generating an output indicative of the probability that the mobile is located at each of said plurality of locations in the service area.

18. A method of estimating the location of a mobile communications unit in a wireless communications service area, comprising the iterative steps of:
   (a) continually checking for the arrival of a location service request from a mobile unit in a predetermined region of said service area;
   (b) identifying said region upon the arrival of a location request based on either the identity of a primary base station or the identity of the strongest pilot signal strength in said predetermined region reported by the mobile unit to computation apparatus located at a predetermined site;
   (c) identifying a set of all pilot signals which are likely to be visible in said predetermined region;
   (d) assigning a-priori probability values to a set of specific locations in said predetermined region;
   (e) determining if step (d) is an initial iteration step;
   (f) in the event that step (d) is the first iteration step computing, for each specific location in said region, the conditional probability of the mobile unit observing the pilot signal strengths at each said specific location as reported in the set of measurements by the mobile unit according to a first conditional probability function;
   (g) if step (d) is not the first iteration step, computing the conditional probability of the mobile unit observing the pilot signal strengths at each said specific location as reported in the set of measurements by the mobile unit according to a second probability function;

(h) computing the joint probability of the mobile unit being at each said specific location and is observing the reported pilot measurements;

(i) computing the a-posteriori probability of the mobile unit being at each said specific location in said region given all of the measurements reported up to the present time by normalizing the joint probabilities computed in step (h) so that a summation of unity results when a summation is carried out over all said specific locations in said region;

(j) noting the arrival of any new measurements of signal strengths;

(k) in the event of the arrival of a new set of signal strength measurements, replacing the a-priori probability values of step (d) with the current a-posteriori location probability distribution of step (i) and repeating steps (e)–(i);

(l) in absence of the reception of additional sets of pilot strengths, computing an estimate of the location of the mobile unit using either the mean, the mode, or any other suitable function, of the a-posteriori location probability distribution; and (m) generating an output indicative of the probability distribution of the location of the mobile unit in said region of the service area.

19. A method according to claim 18, wherein specific locations comprise a set of rectilinear grid points in said region of the service area.

20. A method according to claim 18 wherein the first conditional probability function comprises the expression:

$$Pr\{\underline{\eta}^{(1)} \mid (x, y)\} = \prod_{(i,j) \in V^{(1)}} Pr\{Z_{i,j}(x, y) \geq T\} \cdot \prod_{(i,j) \in \overline{V^{(1)}}} Pr\{Z_{i,j}(x, y) < T\}$$

where, $\underline{\eta}^{(1)}$ is the first set of thresholded pilot signal strength measurements received by the mobile unit, $V^{(1)}$ is the initial set of pilot signals that were reported as visible by the mobile unit, $\overline{V}^{(1)}$ is the set of pilot signals that were reported as not visible by the mobile unit, (x,y) is an arbitrary potential grid-point location for the mobile unit, $Z_{i,j}(x,y)$ is a random variable representing the reported strength of the pilot signal corresponding to sector j of cell site i, given that the mobile unit is located at grid point (x,y), and T is the pilot signal visibility threshold.

21. A method according to claim 18 wherein the second conditional probability function comprises the expression:

$$Pr\{\underline{\eta}^{(n+1)} \mid (x, y), \underline{\eta}^{(n)}\} = \prod_{(i,j) \in K} Pr\{\eta_{i,j}^{(n+1)} \mid (x, y), \eta_{i,j}^{(n)}\}$$

where, n>1 and denotes the current number of completed iterations, $\underline{\eta}^{(n+1)}$ is the next set of thresholded pilot signal strength measurements received by the mobile unit, $\underline{\eta}^{(n)}$ is the most recent set of thresholded pilot signal strength measurements received by the mobile unit, (x,y) is an arbitrary potential grid-point location for the mobile unit, K is the set of all the pilot signals that are potentially visible to the mobile unit, $\eta_{i,j}^{(n)}$ is the most recent thresholded signal strength measurement from the pilot signal corresponding to sector j of cell site i, and $\eta_{i,j}^{(n+1)}$ is the next thresholded pilot signal strength measurement from the pilot signal corresponding to sector j of cell site i.

\* \* \* \* \*